Feb. 28, 1967 L. R. VANCOTT 3,307,016
COLLET FOR WORKPIECE IN ELECTRIC WELDING
Filed Dec. 30, 1964
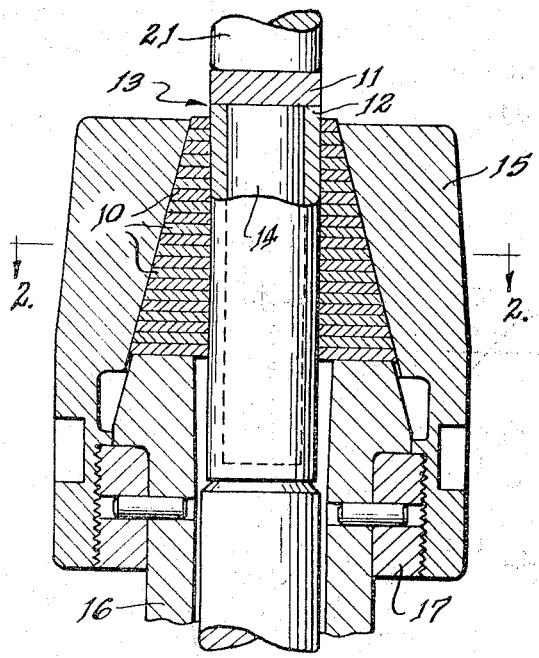
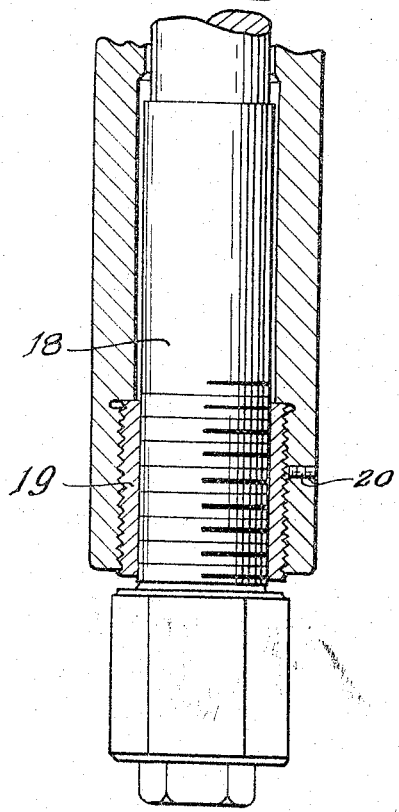
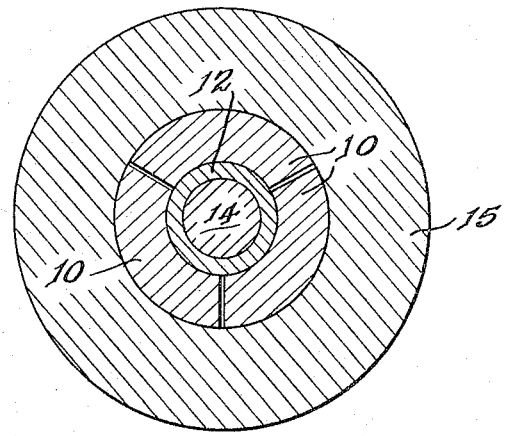
INVENTOR.
Leonard R. Vancott
BY
Roland G. Anderson
Attorney

United States Patent Office 3,307,016
Patented Feb. 28, 1967

3,307,016
COLLET FOR WORKPIECE IN ELECTRIC WELDING
Leonard R. Vancott, San Jose, Calif., assignor to the United States of America as represented by the United States Atomic Energy Commission
Filed Dec. 30, 1964, Ser. No. 422,470
3 Claims. (Cl. 219—158)

The invention described herein was made in the course of, or under, a contract with the U.S. Atomic Energy Commission.

This invention relates to a welding collet. More specifically, it relates to an apparatus for making a welded joint having high electrical resistance and to a collet in such apparatus for holding and supplying welding current to a part on which such a welded joint is to be formed.

Resistance welding of parts having high electrical resistance by a welder having a collet for holding, and supplying current to, one of the parts to be welded provides difficulties, because the low resistance of the collet as compared with the part causes the current to enter the part almost entirely at one end of the collet and thus to cause excessive heating and upsetting of the part just beyond the end of the collet. When a zirconium-alloy jacket of a nuclear-fuel element is bonded to an end piece of zirconium alloy by resistance welding, the electrical resistance of the zirconium alloy is so high with respect to that of the copper collet gripping the jacket that the electrical current enters the jacket almost entirely at one end of the collet, with the result that excessive heating and upsetting of the jacket occur.

I have remedied the above difficulties by progressively increasing the electrical resistance of the welding collet along its length in a direction toward the welded joint to be formed and providing the end of the collet adjacent the welded joint with a resistance higher than that of the parts being welded.

In the drawing:

FIG. 1 is a longitudinal sectional view of the novel welding apparatus of the present invention; and FIG. 2 is a traverse sectional view taken on the line 2—2 of FIG. 1.

The welding apparatus of the present invention has a welding collet formed of a stack of wafers 10 whose electrical resistance varies from a minimum at the bottom of the stack as viewed in FIG. 1 to a maximum at the top of the stack, which maximum is greater than the resistance of the parts being welded, for example, a zirconium-alloy end piece 11 and a zirconium-alloy jacket 12 of a nuclear-fuel element 13 having a uranium-containing core 14. The jacket 12 is gripped in a central opening formed in the stack of wafers 10.

The bottom five wafers 10 have a purity of at least 99.8% and an electrical conductivity of at least 99% I.A.C.S. (International Annealed Copper Standard). The next five wafers 10 are of an alloy containing 1 w/o cadmium and the balance substantially all copper and an electrical conductivity of 90% I.A.C.S. The next four wafers 10 are of an alloy containing 0.5 w/o chromium and the balance substantially copper and an electrical conductivity of 80–85% I.A.C.S. The next two wafers 10 are of an alloy containing 1.5 w/o cobalt, 1.5 w/o beryllium, and the balance substantially all copper and an electrical conductivity of 50% I.A.C.S. The next two wafers 10 are of an alloy containing 20% nickel and the balance substantially all copper. The last two wafers are of a 406 stainless steel containing 0.15 w/o carbon, 12.0–14.0 w/o chromium, 3.5–4.5 w/o aluminum, and the balance substantially all iron. The last two wafers 10, like the previous two, have an electrical resistance higher than that of the zirconium alloy of the jacket 12 and the end piece 11, this alloy containing 1.5 w/o tin, 0.12 w/o iron, 0.10 w/o chromium, 0.05 w/o nickel, and the balance substantially all zirconium. In the above compositions, "w/o" means "percent by weight."

Each of the wafers 10 is formed of three segments and has a conical exterior. The wafers 10 progressively decrease in diameter from the bottom to top and present a conical exterior engageable with a conical interior of a hollow steel member 15. The lower end of the stack of wafers 10 is engaged by the end of a conducting sleeve 16 of copper. A steel collar 17 is pinned to the outside of the sleeve 16 and has threaded engagement with the hollow member 15. Angular movement of the hollow member 15 with respect to the collar 17 shifts the sleeve 16 lengthwise with respect to the hollow member 15 and produces good electrical contact between the sleeve 16 and the bottom of the stack of wafers 10.

A steel post 18 engages the bottom of the fuel element 13 to position it in the wafers 10 before it is gripped thereby. The post 18 is adjusted by being rotated with respect to a steel insert 19 with which it has threaded engagement. The insert 19 is threaded into the lower end of the conducting sleeve 16 and fixed thereto by a set screw 20.

Electrical current for welding the end piece 11 to the jacket 12 is supplied through the conducting sleeve 16 and an electrode 21 pressed down against the end piece 11. Currents up to 270,000 amperes may be used, and the apparatus illustrated may be used on single-phase 60-cycle machine or on a three-phase frequency-converter 12-cycle machine.

Since the wafers 10 are of increasing electrical resistance when considered in an upward direction in FIG. 1 and the top four wafers are of greater electrical resistance than the jacket 12 and end piece 11 being welded, the electrical current passes through the jacket 12 over a great portion of its length, rather than through a narrow portion of the jacket at the upper end of the stack of wafers, there is no overheating of the jacket 12 such as to cause upsetting of the jacket.

It is understood that the invention is not to be limited by the details given herein but that it may be modified within the scope of the appended claims.

The embodiments of the invention in which an exclusive property or privilege is claimed are defined as follows:

1. A welding collet comprising a stack of wafers having a central opening for gripping a part to be welded, the electrical resistance of the wafers increasing progressively from one end of the stack to the other and being higher at the said other end than that of the part to be welded, the wafers being segmented, having conical exteriors, and decreasing in diameter from said one end of the stack to said other end, a hollow member having a conical interior engageable with the conical exteriors of the wafers, a conducting sleeve engageable with the stack of wafers at the said one end for applying electrical current thereto, and a collar pinner to the conducting sleeve and having threaded engagement with the hollow member to adjust the conducting sleeve with respect to the hollow member and thereby press the sleeve firmly against the said one end of the stack of wafers and the hollow member firmly against the conical exterior of the stack of wafers for making the wafers grip the part to be welded.

2. A collet for holding a fuel element by its jacket for welding to an end cap, the jacket and end cap being formed of an alloy composed of 1.5 w/o tin, 0.12 w/o iron, 0.10 w/o chromium, 0.05 w/o nickel, and the balance substantially all zirconium, said collet comprising a stack of wafers for gripping the jacket of the fuel element, the wafers at one end of the stack being of copper of a purity of at least 99.8% and an electrical conductivity of at least 99% I.A.C.S. (International Annealed Copper Standard), the next wafers being of an alloy containing 1 w/o cadmium and the balance substantially all copper and an electrical conductivity of 90% I.A.C.S., the next wafers being of an alloy containing 0.5 w/o chromium and the balance substantially all copper and an electrical conductivity of 80–85% I.A.C.S., the next wafers being of an alloy containing 1.5 w/o cobalt, 1.5 w/o beryllium, and the balance substantially all copper and an electrical conductivity of about 50% I.A.C.S., the next wafers being of an alloy containing 20 w/o nickel and the balance substantially all copper, and the final wafers being of a 406 stainless-steel alloy containing .15 w/o carbon, 12.0–14.0 w/o chromium, 3.5–4.5 w/o aluminum, and the balance substantially all iron.

3. The welding collet specified in claim 2, the wafers being segmented having conical exteriors, and decreasing in diameter from the end of the stack having the wafers of a purity of 99.8% to the end of the stack having the wafers of 406 stainless steel, the collet further comprising a hollow steel member having a conical interior engageable with the conical exteriors of the wafers, a conducting sleeve of copper engageable with the end of the stack of wafers having the purity of 99.8%, and a steel collar pinned to the exterior of the conducting sleeve and having threaded engagement with the hollow member to adjust the same with respect to the sleeve.

References Cited by the Examiner
UNITED STATES PATENTS

| | | | |
|---|---|---|---|
| 1,695,302 | 12/1928 | Thompson | 219—119 X |
| 2,075,121 | 3/1937 | Lessman | 219—59 X |
| 3,239,644 | 3/1966 | Nyborg et al. | 219—161 X |

RICHARD M. WOOD, *Primary Examiner.*

B. A. STEIN, *Assistant Examiner.*